US011361067B2

(12) United States Patent
Chen et al.

(10) Patent No.: US 11,361,067 B2
(45) Date of Patent: Jun. 14, 2022

(54) CROSS AUTHENTICATION METHOD FOR COMPUTER SYSTEM SECURITY

(71) Applicant: MITAC COMPUTING TECHNOLOGY CORPORATION, Hsinchu (TW)

(72) Inventors: Xin Chen, Taoyuan (TW); Leon Li, Taoyuan (TW)

(73) Assignee: Mitac Computing Technology Corporation, Hsinchu (TW)

( * ) Notice: Subject to any disclaimer, the term of this patent is extended or adjusted under 35 U.S.C. 154(b) by 433 days.

(21) Appl. No.: 16/555,828

(22) Filed: Aug. 29, 2019

(65) Prior Publication Data

US 2021/0064734 A1    Mar. 4, 2021

(51) Int. Cl.
 G06F 21/44 (2013.01)
 H04L 9/32 (2006.01)
 H04L 9/08 (2006.01)
 G06F 21/57 (2013.01)

(52) U.S. Cl.
 CPC ............ *G06F 21/44* (2013.01); *G06F 21/572* (2013.01); *G06F 21/575* (2013.01); *H04L 9/0825* (2013.01); *H04L 9/3239* (2013.01)

(58) Field of Classification Search
 CPC ...... G06F 21/44; G06F 21/572; G06F 21/575; H04L 9/0825; H04L 9/3239
 See application file for complete search history.

(56) References Cited

U.S. PATENT DOCUMENTS

| 9,147,086 | B1* | 9/2015 | Potlapally | G06F 21/64 |
| 2013/0185564 | A1* | 7/2013 | Jaber | G06F 21/572 |
| | | | | 713/176 |
| 2017/0085383 | A1* | 3/2017 | Rao | G06F 8/654 |
| 2019/0073478 | A1* | 3/2019 | Khessib | G06F 21/572 |
| 2019/0236271 | A1* | 8/2019 | Sh | H04L 9/3247 |
| 2019/0236279 | A1* | 8/2019 | Depew | G06F 9/44505 |
| 2020/0184077 | A1* | 6/2020 | Venkataraman | G06F 21/575 |
| 2020/0235917 | A1* | 7/2020 | Davenport | H04L 9/0863 |

OTHER PUBLICATIONS

Timothy M. Lambert, Enterprise Platform Systems Management Security Threats and Mitigation Techniques, Report presented to the faculty of the graduate school of the University of Texas at Austin. (Year: 2016).*

* cited by examiner

*Primary Examiner* — Shanto Abedin
(74) *Attorney, Agent, or Firm* — Michael Best & Friedrich LLP

(57) ABSTRACT

A cross authentication method includes steps of: a host central processing unit (CPU) module sending to a baseboard management controller (BIC) a request for BMC signature; the host CPU module receiving BMC signature data from the BMC; the host CPU module determining whether the received BMC signature data is authentic based on a BMC public key stored in the host CPU module; and the host CPU module allowing the BMC to access the host CPU module when it is determined that the BMC signature data is authentic.

14 Claims, 3 Drawing Sheets

CROSS AUTHENTICATION METHOD FOR COMPUTER SYSTEM SECURITY

FIELD

The disclosure relates to a cross authentication method, and more particularly to a verification method used in a computer system with a baseboard management controller (BMC).

BACKGROUND

A conventional computer system has a host including a central processing unit (CPU) module, and a baseboard management controller (BMC) to manage the interface between system-management software and platform hardware. The BMC can monitor sensors of the computer system, report abnormal status, control system reset, activate system power cycling, and even update system firmware (e.g., basic input/output system (BIOS) or U-Boot). However, there is a security concern in such computer system that when one of the BMC and the host is hacked, the other is exposed to the threat of being hacked as well.

SUMMARY

Therefore, an object of the disclosure is to provide a mutual verification strategy to enhance security of the computer system by preventing the use of unsecured hardware or firmware in the computer system.

According to one aspect of the disclosure, a cross authentication method for verifying a baseboard management controller (BMC) of a computer system is provided. The verification method is to be implemented by a host central processing unit (CPU) module of the computer system, and includes steps of: sending a request for BMC signature to the BMC; receiving BMC signature data transmitted from the BMC in response to the request for BMC signature; upon receiving the BMC signature data, determining whether the BMC signature data thus received is authentic based on a BMC public key stored in a CPU boot storage of the host CPU module; and when it is determined that the BMC signature data is authentic, allowing the BMC to access the host CPU module.

According to one aspect of the disclosure, a cross authentication method for verifying a host central processing unit (CPU) module of a computer system is provided. The verification method is to be implemented by a baseboard management controller (BMC) of the computer system, and includes steps of: sending a request for CPU signature to the host CPU module; receiving CPU signature data from the host CPU module in response to the request for CPU signature; upon receiving the CPU signature data, determining whether the CPU signature data thus received is authentic based on a CPU public key stored in a BMC boot storage of the BMC; and when it is determined that the CPU signature data is authentic, allowing the host CPU module to access the BMC boot storage, and enabling the BMC to respond to an operational request received from the host CPU module.

According to one aspect of the disclosure, a host central processing unit (CPU) module to be electrically connected to a baseboard management controller (BMC) is provided. The host CPU module includes a main processor, and a CPU boot storage electrically connected to the main processor. The CPU boot storage stores a BMC public key associated with the BMC. The CPU boot storage has instructions that, when executed by the main processor, cause the main processor to: send a request for BMC signature to the BMC; receive BMC signature data transmitted from the BMC in response to the request for BMC signature; upon receiving the BMC signature data, determine whether the BMC signature data thus received is authentic based on the BMC public key; and when it is determined that the BMC signature data is authentic, allow the BMC to access the host CPU module. In an embodiment, the BMC includes a BMC processor, and a BMC boot storage electrically connected to the BMC processor. The BMC boot storage stores a host CPU public key associated with the host CPU module. The BMC boot storage has instructions that, when executed by the BMC processor, cause the BMC processor to: send a request for host CPU signature to the host CPU module; receive host CPU signature data transmitted from the host CPU module in response to the request for host CPU signature; upon receiving the host CPU signature data, determine whether the host CPU signature data thus received is authentic based on the host CPU public key; and when it is determined that the host CPU signature data is authentic, allow the host CPU module to access the BMC.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
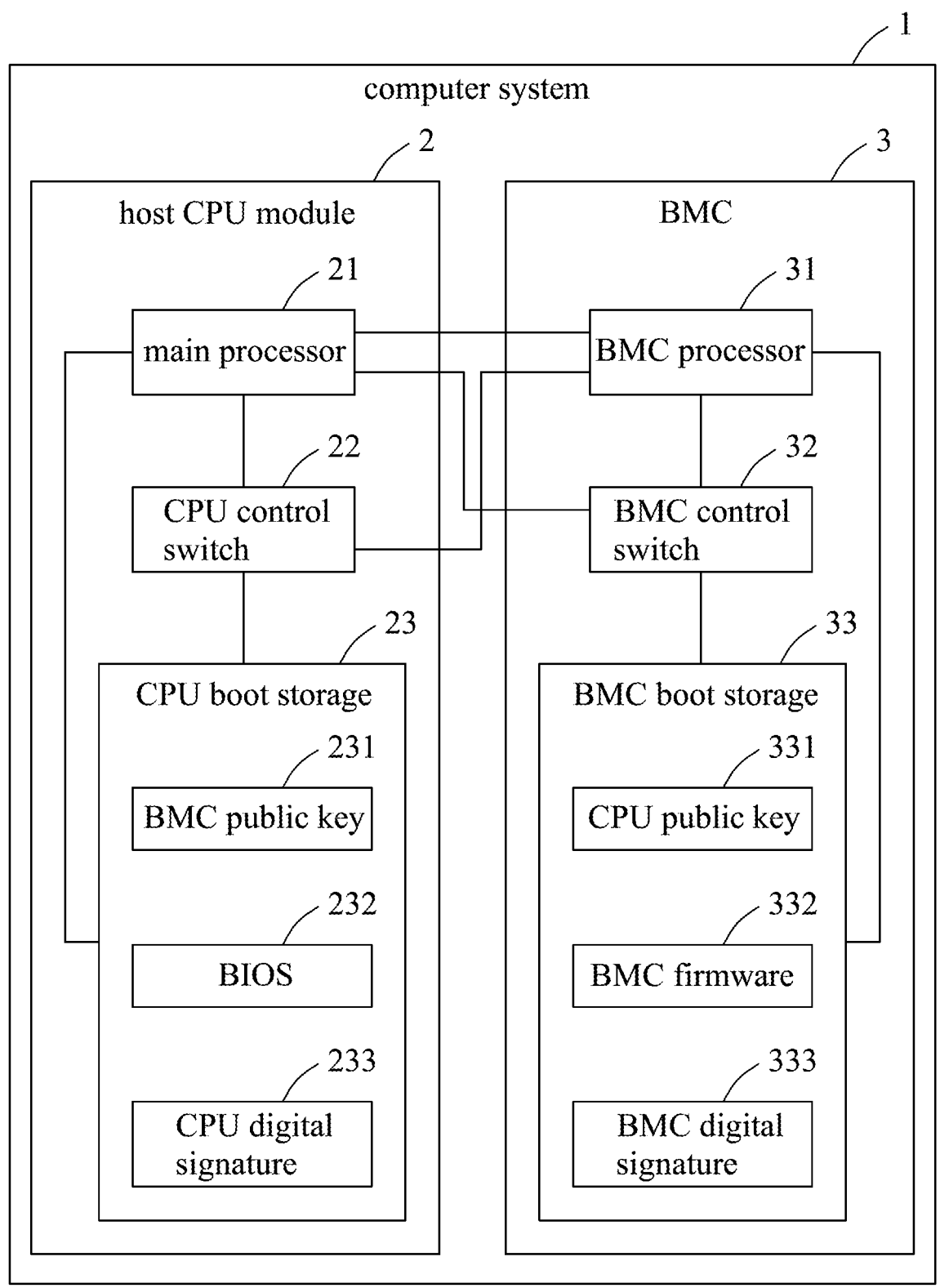
FIG. 1 is a block diagram exemplarily illustrating a computer system according to an embodiment of this disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a computer system 1 according to an embodiment of this disclosure is illustrated. The computer system 1 includes a host central processing unit (CPU) module 2 and a baseboard management controller (BMC) 3 that are electrically connected to each other. The host CPU module 2 and the BMC 3 may be disposed on a same motherboard (not shown) of the computer system 1.

The host CPU module 2 includes a main processor 21, a CPU control switch 22 electrically connected to the main processor 21 and a BMC processor 31 of the BMC 3, and a CPU boot storage 23 electrically connected to the main processor 21 and the CPU control switch 22. In an embodiment, the main processor 21 is a CPU disposed on the motherboard of the computer system 1, and the CPU boot storage 23 is a basic input/output system (BIOS) chip on the motherboard. The CPU control switch 22 controls access of the BMC processor 31 to the CPU boot storage 23. Specifically, the BMC processor 31 may access the CPU boot storage 23 only when the CPU control switch 22 is turned on (e.g., the CPU control switch 22 being in a conductive state). The CPU boot storage 23 stores a BMC public key 231 associated with the BMC 3, a BIOS 232 to be executed by the main processor 21, and a CPU digital signature 233 associated with the host CPU module 2. In an embodiment, the CPU digital signature 233 is generated by performing a hash function (e.g., an MD5 message-digest algorithm) on a fragment of the BIOS 232 to obtain a check code and then encrypting the check code with a CPU private key. According to an embodiment, the CPU private key and the BMC public key 231 are both provided by a third-party certificate authority with a hardware security module (HSM), wherein the CPU private key is managed and confidentially stored in the HSM. In another embodiment, the CPU digital signature 233 is generated by performing the hash function on a combination of the fragment of the BIOS 232 and other data (e.g., at least one of a header of the BIOS 232, a signature of a vendor of the BIOS 232, a version of the BIOS 232, a size of the BIOS 232 or a memory address associated with the fragment of the BIOS 232) to obtain a check code and then encrypting the check code with the CPU private key.

The BMC 3 includes a BMC processor 31, a BMC control switch 32 electrically connected to the BMC processor 31 and the main processor 21 of the host CPU module 2, and a BMC boot storage 33 electrically connected to the BMC processor 31 and the BMC control switch 32. The BMC control switch 32 controls access of the main processor 21 to the BMC boot storage 33. Specifically, the main processor 21 may access the BMC boot storage 33 only when the BMC control switch 32 is turned on (e.g., the BMC control switch 32 being in a conductive state). The BMC boot storage 33 stores a CPU public key 331 associated with the host CPU module 2, a BMC firmware 332 to be executed by the BMC processor 31, and a BMC digital signature 333 associated with the BMC 3. In an embodiment, the BMC digital signature 333 is generated by performing a hash function (e.g., an MD5 message-digest algorithm) on a fragment of the BMC firmware 332 to obtain a check code and then encrypting the check code with a BMC private key. According to an embodiment, the BMC private key and the CPU public key 331 are also provided by the third-party certificate authority, wherein the BMC private key is paired with the BMC public key 231 stored in the CPU boot storage 23, and the CPU public key 331 is paired with the CPU private key. Similar to the CPU private key, the BMC private key is managed and confidentially stored in the HSM. In another embodiment, the BMC digital signature 333 is generated by performing the hash function on a combination of the fragment of the BMC firmware 332 and other data (e.g., at least one of a header of the BMC firmware 332, a signature of a vendor of the BMC firmware 332, a version of the BMC firmware 332, a size of the BMC firmware 332 or a memory address associated with the fragment of the BMC firmware 332) to obtain a check code and then encrypting the check code with the BMC private key.

Figure 2:
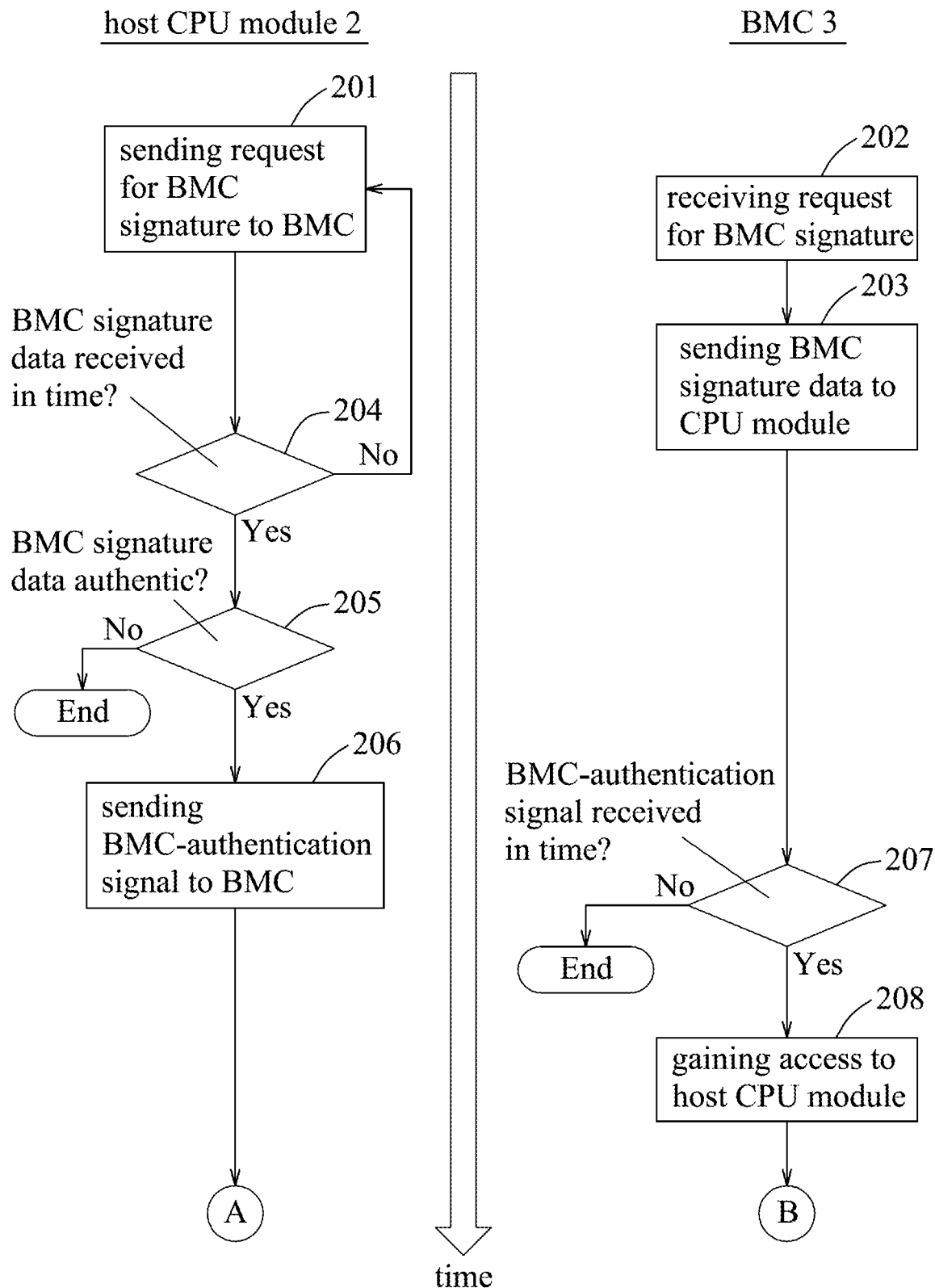
FIGS. 2 and 3 cooperate to illustrate a flow chart of a cross authentication method to be implemented by the computer system of FIG. 1.
Figure 3:
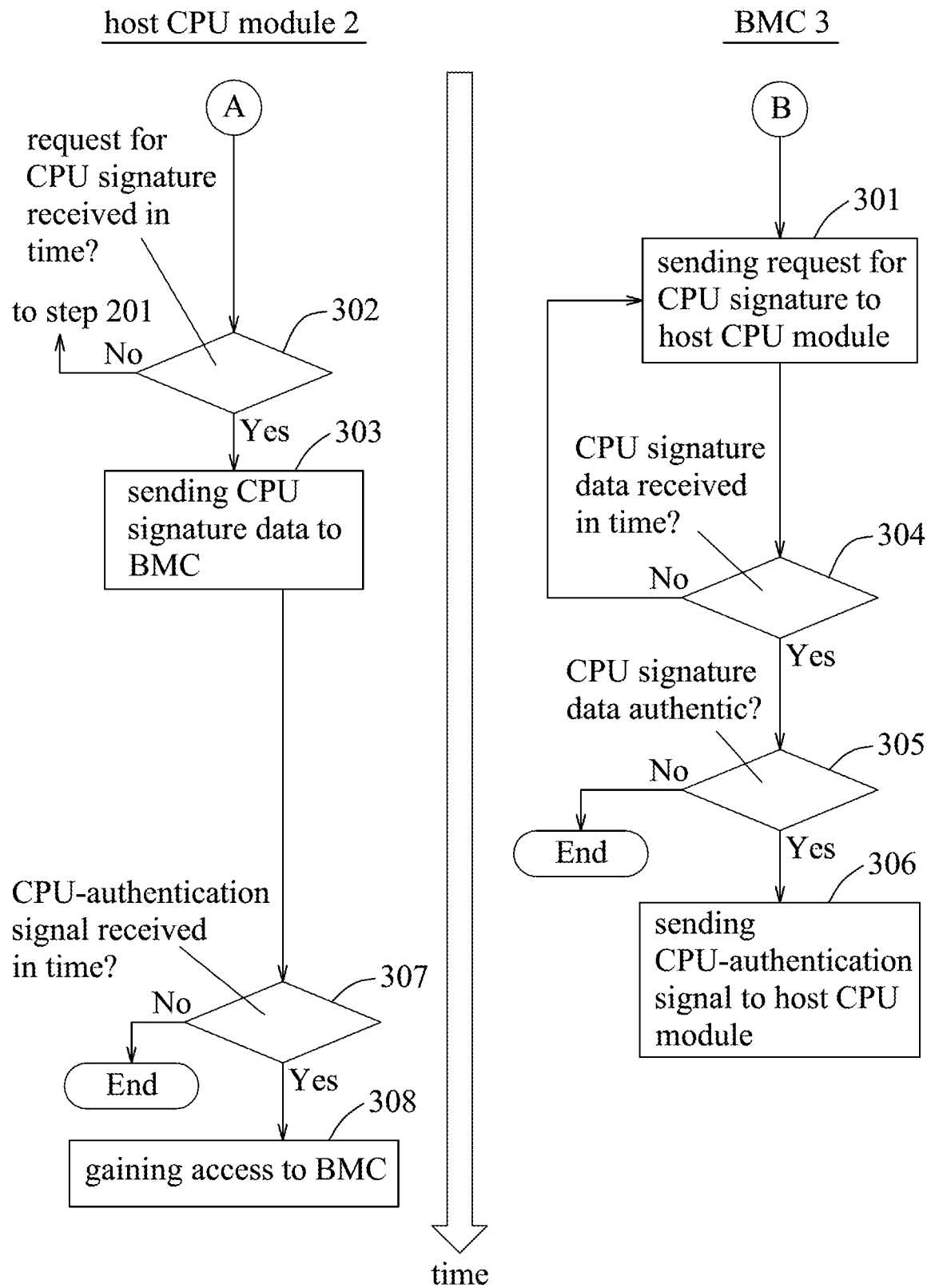

FIGS. 2 and 3 exemplarily illustrate a method to be performed by the computer system 1 each time the computer system 1, the host CPU module 2 or the BMC 3 is started (e.g., hard reset, cold reset or warm reset). The method improves security of the computer system 1 by mutual verification of the host CPU module 2 and the BMC 3 in order to prevent the use of unsecured hardware or firmware in the computer system 1. The method can be divided into a first part and a second part, wherein the first part focuses on verification of the BMC 3 and is illustrated in FIG. 2, and the second part focuses on verification of the host CPU module 2 and is illustrated in FIG. 3. The method is to be performed partially by the host CPU module 2 executing the BIOS 232 and partially by the BMC 3 executing the BMC firmware 332, as shown in FIGS. 2 and 3. It should be noted that in each of FIGS. 2 and 3, the central arrow indicating time is only illustrated to schematically indicate the sequential order of the steps performed by the host CPU module 2 and the BMC 3, and is not indicative of lengths of time intervals between the steps.

Referring to FIG. 2, the method begins from step 201, in which the main processor 21 of the host CPU module 2 sends a request for BMC signature to the BMC 3.

In step 202, the BMC processor 31 of the BMC 3 receives the request for BMC signature from the host CPU module 2.

In step 203, the BMC processor 31 sends BMC signature data to the host CPU module 2 in response to the request received in step 202 through, for example, an Intelligent Platform Management Interface (IPMI). The BMC signature data includes the BMC digital signature 333 stored in the BMC boot storage 33 and BMC plaintext data. As mentioned above, the BMC digital signature 333 may be generated by performing a hash function on a fragment of the BMC firmware 332, or on a combination of the fragment and other data (e.g., a header, a vendor signature, a version, a size and/or a memory address of the BMC firmware 332). According to some embodiments, in a case that the BMC digital signature 333 is generated by performing the hash function on the fragment of the BMC firmware 332, the BMC plaintext data included in the BMC signature data is the fragment of the BMC firmware 332. On the other hand, in a case that the BMC digital signature 333 is generated by performing the hash function on a combination of the fragment of the BMC firmware 332 and other data, the BMC plaintext data included in the BMC signature data is composed of the fragment of the BMC firmware 332 and the other data.

In step 204, the main processor 21 determines whether the host CPU module 2 receives the BMC signature data transmitted from the BMC 3 within a first predetermined period of time since the request for BMC signature was sent to the BMC 3 in step 201. If so, the procedure proceeds to step 205; otherwise, the procedure goes back to step 201. According to an embodiment, the determination of step 204 is made based on a timer that the main processor 21 started upon sending the request for BMC signature to the BMC 3 in step 201. In such, embodiment, when the host CPU module 2 receives the BMC signature data before the timer expires, step 204 determines that the host CPU module 2 has timely received the BMC signature data, and the procedure goes to step 205. On the other hand, when the timer expires before the host CPU module 2 receives any BMC signature data from the BMC 3, step 204 may determine that the host CPU module 2 fails to timely receive the BMC signature data upon expiration of the timer, and the procedure goes back to step 201. In some embodiments, the host CPU module 2 may ignore any BMC signature data that is received after the timer expires.

In step 205, the main processor 21 determines whether the BMC signature data thus received is authentic based on the BMC public key 231 stored in the CPU boot storage 23. Specifically, the main processor 21 obtains a first check code by performing the hash function, which has been used to generate the BMC digital signature 333 in step 203, on the BMC plaintext data contained in the BMC signature data thus received, and obtains a second check code by decrypting, with the BMC public key 231, the BMC digital signature contained in the BMC signature data thus received. Then, the main processor 21 determines whether the BMC signature data is authentic by determining whether the first and second check codes match each other. If the first and second check codes match each other, the procedure proceeds to step 206. If the first and second check codes do not match, the procedure ends.

In step 206, the main processor 21 sends a BMC-authentication signal to the BMC 3 to notify the BMC 3 that the BMC signature data is authentic and that the BMC 3 is allowed to access the host CPU module 2, and turns on the CPU control switch 22 for the BMC processor 31 to be able to access the CPU boot storage 23. From now on, the host CPU module 2 can properly respond to an operational request received from the BMC by executing an operation associated with the operational request. For example, in response to the operational request sent by the BMC 3 to the host CPU module 2, the host CPU module 2 executes an operation that includes providing information of the computer system 1 to the BMC 3, restarting the CPU module 2, etc. According to an embodiment, the BMC 3 gains not only access to the CPU boot storage 23 but also control on the main processor 21 when the BMC signature data has been verified as authentic by the main processor 21.

In step 207, the BMC processor 31 determines whether the BMC 3 receives the BMC-authentication signal transmitted from the host CPU module 2 within a second predetermined period of time since the BMC signature data was sent to the host CPU module 2 in step 203. If so, the procedure proceeds to step 208; otherwise, the procedure ends. It should be noted that, when the BMC processor 31 of the BMC 3 receives another request for BMC signature from the host CPU module 2 (step 202) again after the procedure ends, the method will resume from step 203 and subsequent steps will be performed. Similar to step 204, the determination of step 207 may be made based on a timer that the BMC processor 31 started upon sending the BMC signature data to the host CPU module 2 in step 203.

In step 208, the BMC 3 gains access to the host CPU module 2 upon receiving the BMC-authentication signal and determining that the BMC-authentication signal was received within the second predetermined period of time. At this time, the BMC 3 has been confirmed by the host CPU module 2 to be safe and trusty. Therefore, the BMC 3 is allowed by the host CPU module 2 to access the CPU boot storage 23, and maybe even the main processor 21.

Referring to FIG. 3, the method continues to step 301, in which the BMC processor 31 of the BMC 3 sends a request for CPU signature to the host CPU module 2.

In step 302, the main processor 21 of the host CPU module 2 determines whether the host CPU module 2 receives the request for CPU signature transmitted from the BMC 3 within a third predetermined period of time since the BMC-authentication signal was sent to the BMC 3 in step 206. If so, the procedure proceeds to step 303; otherwise, the procedure goes back to step 201. Similarly, the determination of step 302 may be made based on a timer that the main processor 21 started upon sending the BMC-authentication signal to the BMC 3 in step 206.

In step 303, the main processor 21 sends CPU signature data to the BMC 3 in response to the request for CPU signature through, for example, the IPMI. The CPU signature data includes the CPU digital signature 233 stored in the CPU boot storage 23 and CPU plaintext data. As mentioned above, the CPU digital signature 233 may be generated by performing a hash function on a fragment of the BIOS 232, or on a combination of the fragment of the BIOS 232 and other data (e.g., a header, a vendor signature, a version, a size and/or a memory address of the BIOS 232). According to some embodiments, in a case that the CPU digital signature 233 is generated by performing the hash function on the fragment of the BIOS 232, the CPU plaintext data included in the CPU signature data is the fragment of the BIOS 232. On the other hand, in a case that the BIOS digital signature 233 is generated by performing the hash function on a combination of the fragment of the BIOS 232 and other data, the CPU plaintext data included in the CPU signature data is composed of the fragment of the BIOS 232 and the other data.

In step 304, the BMC processor 31 determines whether the BMC 3 receives the CPU signature data transmitted from the host CPU module 2 within a fourth predetermined period of time since the request for CPU signature was sent to the host CPU module 2 in step 301. If so, the procedure proceeds to step 305; otherwise, the procedure goes back to step 301. The determination of step 304 may be made based on a timer that was started by the BMC processor 31 upon sending the request for CPU signature in step 301.

In step 305, the BMC processor 31 determines whether the CPU signature data thus received is authentic based on the CPU public key 331 stored in the BMC boot storage 33. Specifically, the BMC processor 31 obtains a first check code by performing the hash function, which has been used to generate the CPU digital signature 233 in step 303, on the CPU plaintext data contained in the CPU signature data thus received, and obtains a second check code by decrypting, with the CPU public key 331, the CPU digital signature contained in the CPU signature data thus received. Then, the BMC processor 31 determines whether the CPU signature data is authentic by determining whether the first and second check codes match each other. If the first and second check codes match each other, the procedure proceeds to step 306. If the first and second check codes do not match, the procedure ends.

In step 306, the BMC processor 31 sends a CPU-authentication signal to the host CPU module 2 to notify the host CPU module 2 that the CPU signature data is authentic and that the host CPU module 2 is allowed to access the BMC 3, and turns on the BMC control switch 32 for the host CPU module 2 to be able to access the BMC boot storage 33. From now on, the BMC 3 can properly respond to an operational request from the host CPU module 2 by executing an operation associated with the operational request. For example, in response to the operational request sent by the host CPU module 2 to the BMC 3, the BMC 3 executes an operation that includes getting a file from an external storage, restarting the BMC 3, etc. According to an embodiment, the operational request may include a request for information, in response to which the BMC 3 would send requested information to the host CPU module 2. In addition, the host CPU module 2 may further be allowed to alter/update the BMC firmware 332 stored in the BMC boot storage 33.

In step 307, the main processor 21 determines whether the host CPU module 2 receives the CPU-authentication signal transmitted from the BMC 3 within a fifth predetermined period of time since the CPU signature data was sent to the BMC 3 in step 303. If so, the procedure proceeds to step 308; otherwise, the procedure ends. It should be noted that, when the host CPU module 2 receives another request for CPU signature sent by the BMC processor 31 (step 301) again after the procedure ends, the method will resume from step 302 and subsequent steps will be performed. The determination of step 307 may be made based on a timer that was started by the main processor 21 upon sending the CPU signature data in step 303.

In step 308, the host CPU module 2 gains access to the BMC 3 upon receiving the CPU-authentication signal and determining that the CPU-authentication signal was received within the fifth predetermined period of time. At this time, the host CPU module 2 and the BMC 3 are confirmed by each other to be safe and trusty. That is, cooperation and data communication between the host CPU module 2 and the BMC 3 are secured.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A cross authentication method for verifying a baseboard management controller (BMC) of a computer system to be implemented by a host central processing unit (CPU) module of the computer system, the verification method comprising steps of:
   sending a request for BMC signature to the BMC;
   receiving BMC signature data transmitted from the BMC in response to the request for BMC signature;
   upon receiving the BMC signature data, determining whether the BMC signature data thus received is authentic based on a BMC public key stored in a CPU boot storage of the host CPU module;
   when it is determined that the BMC signature data is authentic, allowing the BMC to access the CPU boot storage, and enabling the host CPU module to respond to an operational request received from the BMC;
   when it is determined that the BMC signature data is authentic, sending a BMC-authentication signal to the BMC to notify the BMC that the BMC signature data is authentic, that the BMC is allowed to access the CPU boot storage, and enabling the host CPU module to respond to the operational request received from the BMC;
   after the step of sending a BMC-authentication signal to the BMC, when a predetermined period of time since the BMC-authentication signal was sent to the BMC has elapsed without receiving a request for CPU signature that is sent from the BMC, repeating the step of sending a request for BMC signature to the BMC;
   when the request for CPU signature is received within the predetermined period of time since the BMC-authentication signal was most recently sent to the BMC, sending CPU signature data to the BMC in response to the request for CPU signature;
   receiving a CPU-authentication signal that is transmitted from the BMC when the BMC determines that the CPU signature data is authentic; and
   upon receiving the CPU-authentication signal, gaining access to a BMC boot storage of the BMC.

2. The cross authentication method of claim 1, wherein:
   the step of receiving BMC signature data is to receive the BMC signature data including a BMC digital signature and BMC plaintext data that are associated with a fragment of a BMC firmware of the BMC, the BMC digital signature being generated by performing a hash function on the fragment of the BMC firmware to obtain a check code and then encrypting the check code with a BMC private key that is paired with the BMC public key to obtain the BMC digital signature; and
   the step of determining whether the BMC signature data is authentic includes sub-steps of:
      obtaining a first check code by performing the hash function on the BMC plaintext data contained in the BMC signature data thus received;
      obtaining a second check code by decrypting, with the BMC public key, the BMC digital signature contained in the BMC signature data thus received; and
      determining whether the BMC signature data is authentic by determining whether the first and second check codes match each other.

3. The cross authentication method of claim 2, wherein the hash function is an MD5 message-digest algorithm.

4. The cross authentication method of claim 1, the host CPU module including a CPU control switch electrically connected between the CPU boot storage and a BMC processor of the BMC, the verification method further comprising a step of:
   when it is determined that the BMC signature data is authentic, turning on the CPU control switch to allow the BMC to access the CPU boot storage, and enabling the host CPU module to respond to the operational request received from the BMC.

5. The cross authentication method of claim 1, wherein the step of sending CPU signature data is to send the CPU signature data that includes a CPU digital signature of the host CPU module and that includes CPU plaintext data associated with a fragment of a basic input/output system (BIOS) of the host CPU module, the CPU digital signature being generated by performing a hash function on the fragment of the BIOS to obtain a check code and then encrypting the check code with a CPU private key.

6. The cross authentication method of claim 1, the BMC including the BMC boot storage storing a BMC firmware, wherein, in the step of gaining access to the BMC upon receiving the CPU-authentication signal, the host CPU module gains access to the BMC boot storage via a BMC control switch that is electrically connected between the host CPU module and the BMC boot storage and that is turned on by the BMC when the BMC determines that the CPU signature data is authentic.

7. A cross authentication method for verifying a host central processing unit (CPU) module of a computer system to be implemented by a baseboard management controller (BMC) of the computer system, the verification method comprising steps of:
   sending a request for CPU signature to the host CPU module;
   when a predetermined period of time since the request for CPU signature was sent to the host CPU module has elapsed before receiving CPU signature data from the host CPU, repeating the step of sending a request for CPU signature;

receiving the CPU signature data from the host CPU module in response to the request for CPU signature;

upon receiving the CPU signature data within the predetermined period of time since the request for CPU signature was most recently sent to the host CPU module, determining whether the CPU signature data thus received is authentic based on a CPU public key stored in a BMC boot storage of the BMC;

when it is determined that the CPU signature data is authentic, allowing the host CPU module to access the BMC boot storage, and enabling the BMC to respond an operational request received from the host CPU module;

receiving a request for BMC signature from the host CPU module;

sending BMC signature data to the host CPU module in response to the request for BMC signature;

receiving a BMC-authentication signal that is transmitted from the host CPU module when the host CPU module determines that the BMC signature data is authentic; and gaining access to the host CPU module upon receiving the BMC-authentication signal.

8. The cross authentication method of claim 7, wherein:

the step of receiving CPU signature data is to receive the CPU signature data including a CPU digital signature and CPU plaintext data that are associated with a fragment of a basic input/output system (BIOS) of the host CPU module, the CPU digital signature being generated by performing a hash function on the fragment of the BIOS to obtain a check code and then encrypting the check code with a CPU private key that is paired with the CPU public key to obtain the CPU digital signature; and the step of determining whether the CPU signature data is authentic includes sub-steps of:

obtaining a first check code by performing the hash function on the CPU plaintext data contained in the CPU signature data thus received;

obtaining a second check code by decrypting, with the CPU public key, the CPU digital signature contained in the CPU signature data thus received; and determining whether the CPU signature data is authentic by determining whether the first and second check codes match each other.

9. The cross authentication method of claim 8, wherein the hash function is an MD5 message-digest algorithm.

10. The cross authentication method of claim 7, the BMC including a BMC control switch electrically connected between the BMC boot storage and a main processor of the CPU module, the verification method further comprising a step of:

when it is determined that the CPU signature data is authentic, turning on the BMC control switch to allow the host CPU module to access the BMC boot storage, and enabling the BMC to respond the operational request received from the host CPU module.

11. The cross authentication method of claim 7, the host CPU module including a CPU boot storage storing a BIOS, wherein, in the step of gaining access to the host CPU module upon receiving the BMC-authentication signal, the BMC gains access to the CPU boot storage via a CPU control switch that is electrically connected between a BMC processor of the BMC and the CPU boot storage and that has been turned on by the host CPU module when the host CPU module determines that the BMC signature data is authentic.

12. The cross authentication method of claim 7, wherein the step of sending BMC signature data is to send the BMC signature data that includes a BMC digital signature of the BMC and that includes BMC plaintext data associated with a fragment of a BMC firmware of the BMC, the BMC digital signature being generated by performing a hash function on the fragment of the BMC firmware to obtain a check code and then encrypting the check code with a BMC private key.

13. A host central processing unit (CPU) module to be electrically connected to a baseboard management controller (BMC), said host CPU module comprising:

a main processor; and a CPU boot storage electrically connected to said main processor and storing a BMC public key associated with the BMC, said CPU boot storage having instructions that, when executed by said main processor, cause said main processor to send a request for BMC signature to the BMC;

receive BMC signature data transmitted from the BMC in response to the request for BMC signature;

upon receiving the BMC signature data, determine whether the BMC signature data thus received is authentic based on the BMC public key;

when it is determined that the BMC signature data is authentic, allow the BMC to access said CPU boot storage, and enable the host CPU module to respond to an operational request received from the BMC;

when it is determined that the BMC signature is authentic, send a BMC-authentication signal to the BMC to notify the BMC that the BMC is allowed to access said the host CPU module;

within a predetermined period of time since the BMC-authentication signal was sent to the BMC, receive a request for CPU signature from the BMC;

send CPU signature data to the BMC in response to the request for CPU signature;

receive a CPU-authentication signal that is transmitted from the BMC when the BMC determines that the CPU signature data is authentic; and gain access to the BMC upon receiving the CPU-authentication signal.

14. The host CPU module of claim 13, the BMC including a BMC processor, said host CPU module further comprising:

a CPU control switch electrically connected between said CPU boot storage and the BMC processor, wherein the instructions stored in said CPU boot storage further cause, when executed by said main processor, said main processor to when it is determined that the BMC signature data is authentic, turn on said CPU control switch to allow the BMC to access said CPU boot storage.

* * * * *